United States Patent [19]

Stearns

[11] 3,768,306
[45] Oct. 30, 1973

[54] ULTRASONIC APPARATUS AND METHOD FOR ANALYZING DEFECTS IN MATERIAL

[76] Inventor: Charles A. Stearns, Apt. 17, 2215 Ambassador Dr., N.E. Executive West, Albuquerque, N. Mex. 87100

[22] Filed: Dec. 20, 1971

[21] Appl. No.: 209,870

[52] U.S. Cl. .............................................. 73/67.8 R
[51] Int. Cl. .......................................... G01n 29/04
[58] Field of Search ................... 73/67.5, 67.7, 67.8, 73/67.85, 71.5

[56] References Cited
UNITED STATES PATENTS

| 2,971,372 | 2/1961 | Lewis et al. ...................... 73/67.5 R |
| 3,426,585 | 2/1969 | Zemanek et al. ...................... 73/67.7 |
| 2,846,875 | 8/1958 | Grabendörfer ...................... 73/67.8 |
| 3,028,751 | 4/1962 | Joy ...................................... 73/67.7 X |
| 3,442,119 | 5/1969 | Cowan ........................... 73/67.5 R |
| 2,799,157 | 7/1957 | Pohlman ............................. 73/67.7 |

Primary Examiner—Richard C. Queisser
Assistant Examiner—Arthur E. Korkosz
Attorney—Robert S. Auten et al.

[57] ABSTRACT

A pair of ultrasonic transducers, operatively connected to electrical signal generating and detecting circuits, are mounted in spaced relationship for movement through a liquid confined in a couplent chamber. A flexible wall of the chamber is adapted for close engagement against a wall surface of material to be tested for a suspected internal flaw. The chamber can be selectively positioned on this surface for ultrasonic energy transmission through the flexible wall into the material at a plurality of positions adjacent the suspected defect. A series of passes of the transducers is made in sequential order along lines longitudinally oriented with respect to the surface but transversely spaced across the surface. At those points where the detecting means reveal an interruption, or resumption, of ultrasonic energy transmission through the material, scale indicators, associated with the transducers, can be read to obtain numerical values indicative of the profile and location of the suspected defect.

7 Claims, 13 Drawing Figures

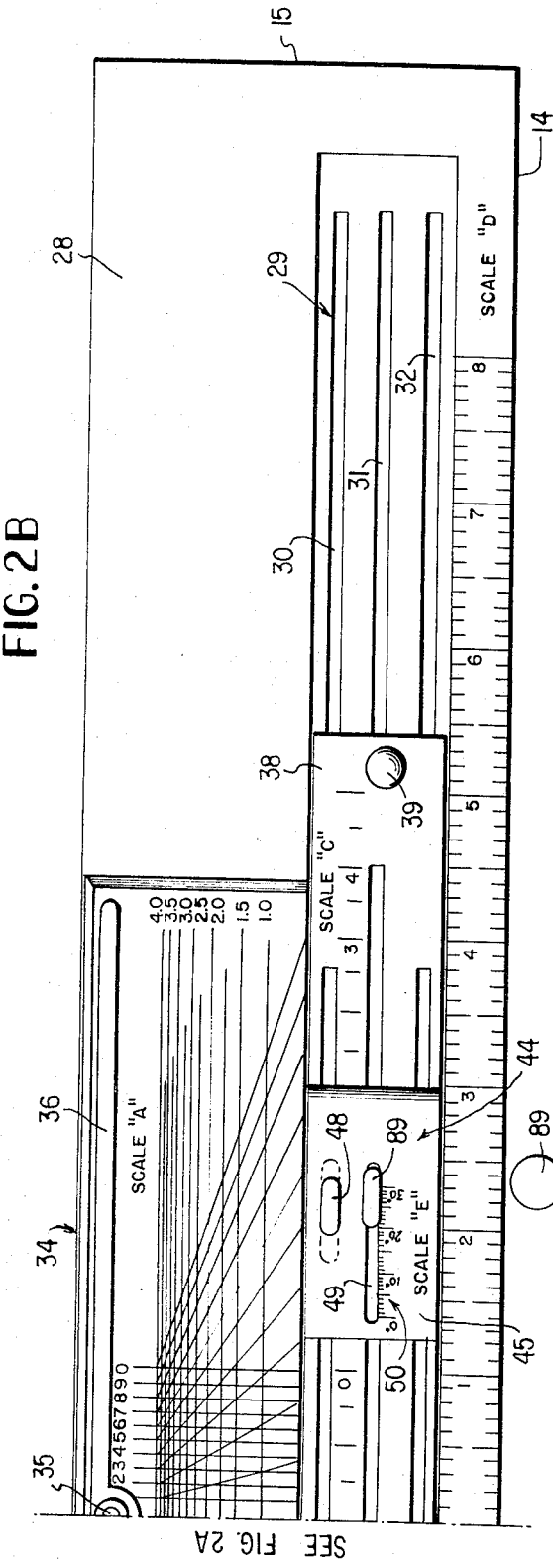
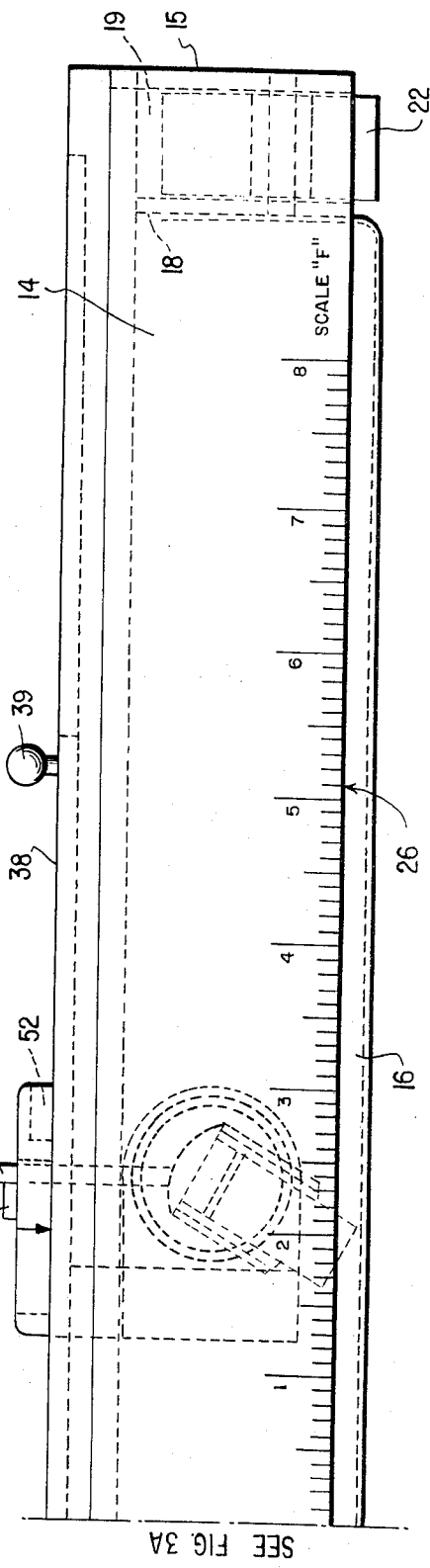

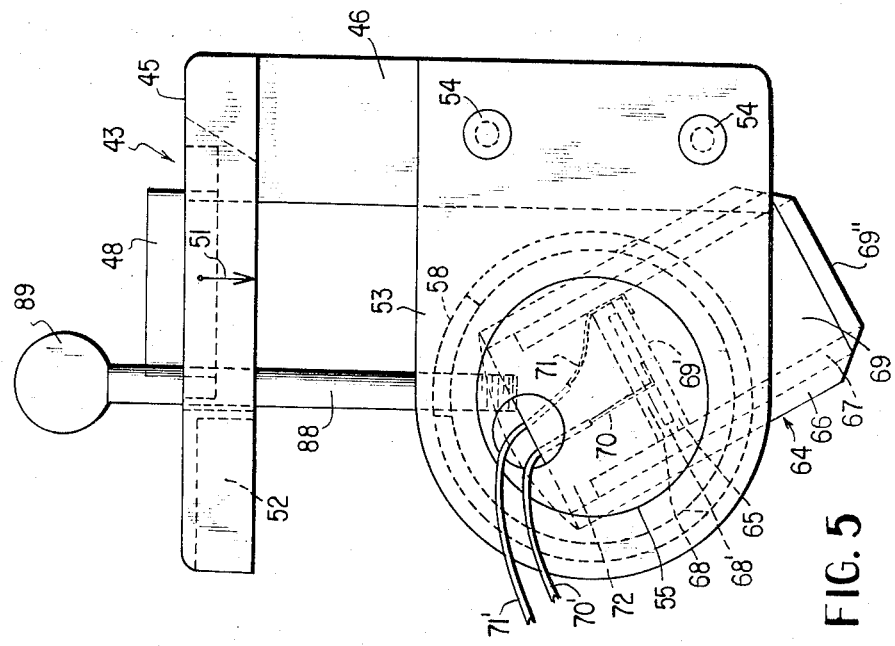

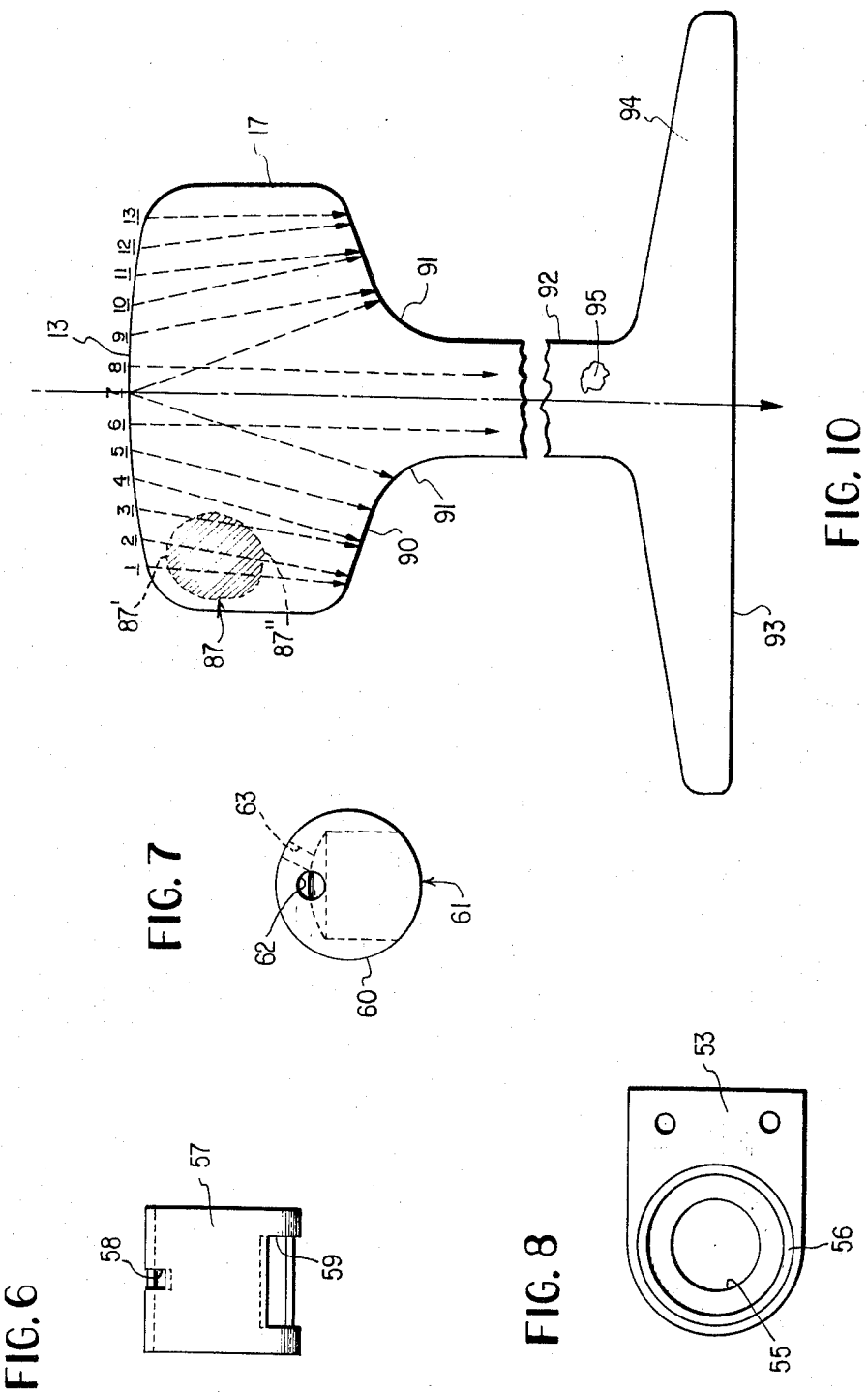

ULTRASONIC APPARATUS AND METHOD FOR ANALYZING DEFECTS IN MATERIAL

BACKGROUND OF THE INVENTION

The invention relates in general to ultrasonic testing of materials. The determination of properties of a material by measuring the transmission of ultrasonic waves through the material is now well known in the art. In fact various types of apparatus and methods have been devised to use ultrasonic waves as the testing medium in a number of fields.

One of the most promising fields for the use of apparatus and methods designed for ultrasonic testing of material is in the testing of railroad track rails to determine whetehr flaws or defects exist in the rail or in the welds between rail sections. Obviously a defective rail or a weld can present a real hazard to train operation and this hazard is of increasing concern as train speeds and weight are increased to meet modern operating conditions.

In order to detect flaws of defects in railroad track, rail flaw detector cars, which can move on the rails in the track, have been used for some time. Various systems have been used including the use of ultrasonic equipment in which the ultrasonic energy is transmitted into the rail by means of transducers that are operative coupled to the rail by means of a couplent such as water or oil. With this arrangement ultrasonic waves can be transmitted into the rail as the car moves along the track and during such movement indicating means on the car are scruitinized and the indications analyzed by operators to determine whether flaws or defects exist in the section of track being tested.

The pulse-echo system of ultrasonic testing (i.e., a beam reflected from the target back to the point of origin) is generally used in mobile devices, such as a rail flaw detector car, because its intelligence is less affected by accidental signal losses of short duration than is the case in the use of point-to-point energy beam transmission. However, its usefulness is somewhat impaired by the fact that, within the useful range of angular ultrasonic trajectory (mean, about 27° from the horizontal) most of the wave energy courses at or near the surface of the rail. While penetration in depth is more than adequate, typical defects of moderate size, having an upper limb more than approximately one tenth of an inch beneath the surface of the rail cannot be detected at distances greater than 4 or 5 inches, however strong the transmitted signal energy. One the other hand deep headchecking, thermal cracks and certain shelling may present an ideal target, since there is virtually no resistance to energy conducted at or near the surface of the rail. Furthermore, these defects may be detected at a distance six times that of the legitimate defect of moderate size. In addition the echoed signal, since it is collected after considerable dispersion, several inches from the target, cannot indicate the size of the target, but only its reflective quality. Therefore it is often impossible to distinguish between small, but important defects and highly reflective, insubstantial surfaces, such as are presented by dendritic crystallization in welds, the improperly ground fillets of certain welds, and certain shelling and headchecking.

Because of the above mentioned problem it is necessary in some cases to stop the car and to make an on the spot check of suspected defects which might be indicated by the car equipment. In the art this is known as "hand-testing" and of course permits a more precise and efficient determination because the equipment is used to scan a very restricted area of rail. This hand check then permits a more accurate testing than is generally obtainable in the use of flaw detector cars. In fact, hand-testing is often required at specific locations along the track at which it may be difficult for the flaw detecting equipment on the car to adequately and accurately detect the flaw or the defect.

However pulse-echo ultrasonic hand-test devices presently used to verify defects found by ultrasonic detector cars cannot readily differentiate between insignificant small cracks with highly reflective facets, and true developed defects which present, by virtue of their irregularities, a surface of inferior reflectivity. This problem exists also in testing of materials and welds in fields other than that of track testing.

SUMMARY OF THE INVENTION

It is therefore an object of the invention to provide apparatus which can be used to accurately indicate size, shape and position of defects or flaws in a material and thereby provide a means for differentiating between such defects or flaws.

It is a further object of the invention to provide a portable apparatus which utilizes ultrasonic test means which can be applied to a single surface of a material to be scanned for internal defects or flaws.

While the system and apparaus, according to the invention, will be described later in conjunction with its use in testing of railroad rail it should be stressed that this is only one field of testing in which the invention can be advantageously used. Thus the invention can be used for testing welds in many areas such as in pipe lines, hulls of submarines and other ships, building structures, or welded pieces conveyed on assembly lines adaptable to jigging for testing purposes.

In general the apparatus provided to carry out the analysis of defects in material includes a couplant chamber which can be adjustably positioned on the material, such as a railroad rail, over a suspected defect area or an area to be initially tested. A bottom wall of the chamber is flexible so as to closely conform to and make close contact with the surface contour of the material. The couplant chamber also serves to support a carriage which is movable over the couplant top surface longitudinally with respect to the surface of the material. This carriage carries two ultrasonic transducer holders which depend from the carriage to position the transducers in a couplant in the chamber and the transducers are adjustable with respect to the surface of the material. The holders are longitudinally movable within the carriage and this spacing between holders can be adjusted.

Suitable ultrasonic excitation and receiving means are provided whereby a transmitting transducer, in the form of a piezoelectric crystal, transmits an ultrasonic wave into the rail and this wave travels through the rail and is reflected from a surface thereof to be received at the receiving crystal connected to suitable signal receiving and indicating means. The angle of transmission of the ultrasonic waves into the head of the rail on which the apparatus is positioned can be varied to suit conditions existing at the spot and in operation the defect or flaw which is to be analyzed is <u>traversed by the carriages</u> carrying the transmitting and receiving transducers.

Before commencing the operation, the general location of the flaw is determined and the couplant chamber is disposed centrally over this flaw area. The carriage containing the transmitting and receiving crystals, spaced apart at a predetermined distance, is positioned to one side of the flaw. Further, the carriage is positioned at a first location so that the transmitting and receiving crystals are transversely spaced from an edge of the rail, say the gauge side. This position defines a first plane or line for one pass of the transmitting and receiving crystals longitudinally of the rail. Once this position has been set the carriage is moved say from left to right across the defect or flaw. In a point-to-point transmission ultrasonic energy is transmitted into the rail and is received at the receiving crystal as the beam is reflected from a rail surface such as the bottom of the rail head or the fillet portion thereof. On either side of the defect this transmission is continuously received and the crystal indicating means will indicate a continuity of wave transmission. However, as the flaw is approached the ultrasonic wave train encounters the flaw and there is an interruption or attenuation of the transmission of energy to the receiving transmission during the time the apparatus is moving across the flaw location. Dependent upon the size of the flaw this wave transmission will be completed after a time interval when the apparatus has passed beyond the flaw and at that time, the indicating means will indicate this reemergence of the ultrasonic wave transmission previously blocked by the flaw.

At the times that the indicating means reveal an interruption or resumption of ultrasonic energy transmission a marker arm is moved to the position then occupied by the receiving crystal as longitudinally spaced from the defect. A scale means associated with the marker arm is then read to determine the depth within the material, of the upper and lower limbs or surfaces respectively of the defect.

After the above described movement of the carriage in one direction the carriage is then moved from right to left and the location of the crystals at the time of wave attenuation is again noted. Thus four fixes are obtained on the flaw; two from the cut-off point or interruption of wave transmission and two at the point of resumption or emergence of wave transmission. The pairs of fixes can then be averaged to give the desired measurement of the upper and lower limbs of the flaw.

If it is desired to corroborate measurements taken in the manner described above, the distance between the transmitting and receiving crystals can be changed so there will be a new angle of transmission of ultrasonic energy between the crystals. The operation just described is repeated to give new fixes on the flaw or defect.

It will be appreciated that passes made along one plane or line, generally longitudinally oriented with respect to surface of the material being tested, will give no clue as to the transverse extent of such flaw or defect. In order to obtain this profile the couplent chamber can be displaced transversely from the first plane to a second plane or line where measurements can again be made in a similar manner. The couplent chamber can then be moved to a third plane and, if required, to successive planes until the transverse dimension of the flaw is measured.

BRIEF DESCRIPTION OF THE DRAWINGS

FIGS. 2a and 2b together show a top plan view of the analyzer.

FIGS. 3a and 3b together show a front elevation view of the analyzer.

FIG. 4 is an end view of the analyzer.

FIG. 5 is a detailed view of the mounting means for a crystal holder shown partially in section, which is used in the analyzer.

FIG. 6 is a side elevation view of one of the components of the mounting means shown in FIG. 5.

FIG. 7 is an end view of another component used in the mounting means.

FIG. 8 is a side elevation view of still another component of the mounting means.

FIG. 10 is an end view of a rail which has a defect on the head portion and showing diagrammatically the scanning lines.

DESCRIPTION OF THE PREFERRED EMBODIMENTS

Figure 1:
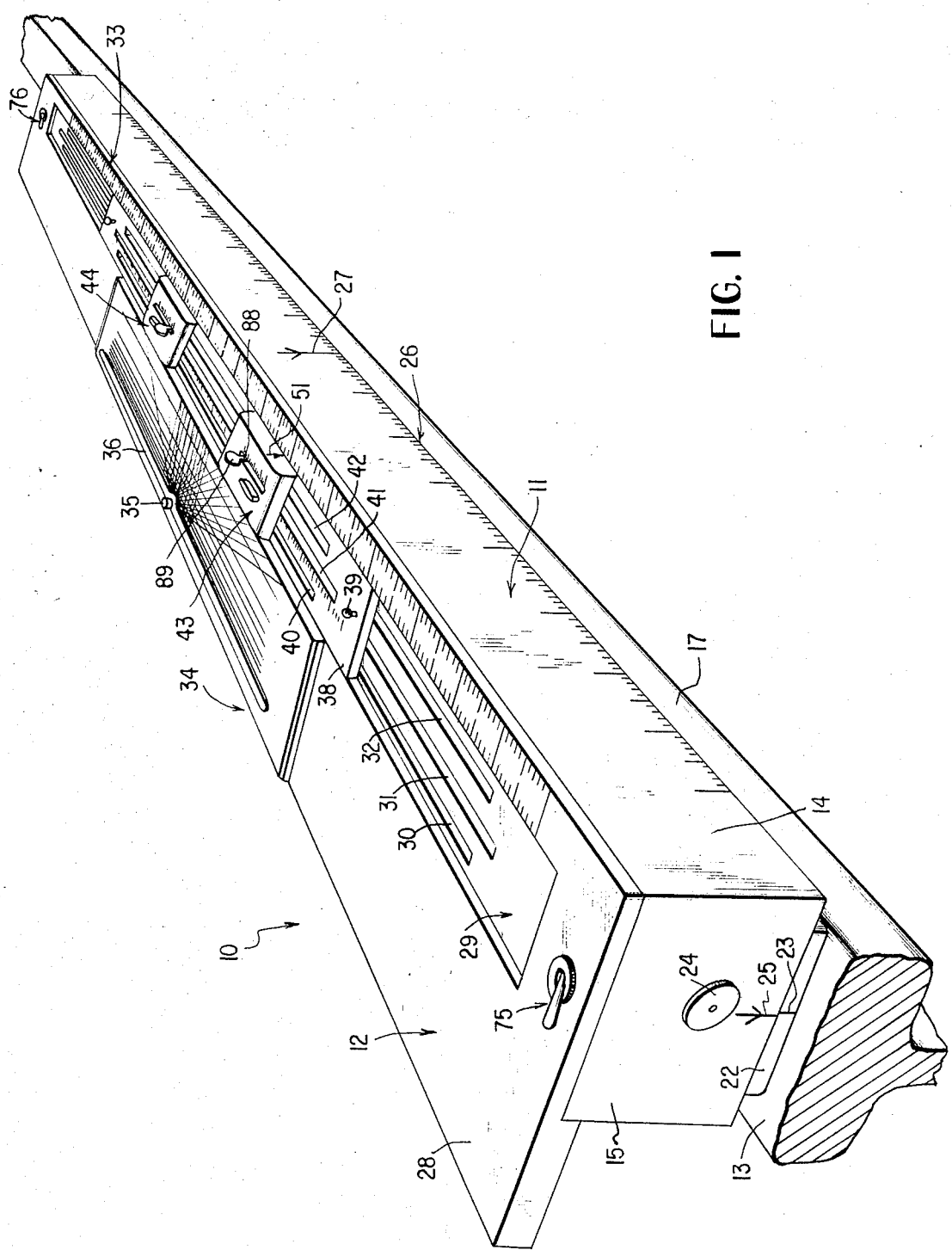
FIG. 1 is a perspective view of the analyzer as positioned on top of a piece of material which is to be tested.

As seen in FIG. 1 the analyzer, generally shown at 10, includes a body portion and a top wall portion, generally indicated at 11 and 12 respectively. The analyzer is adapted to be releasably positioned on the surface 13 of a piece of material to be tested and, for purposes of this disclosure, the analyzer will be discussed as it is used on a head of railroad rail.

Figure 2A:
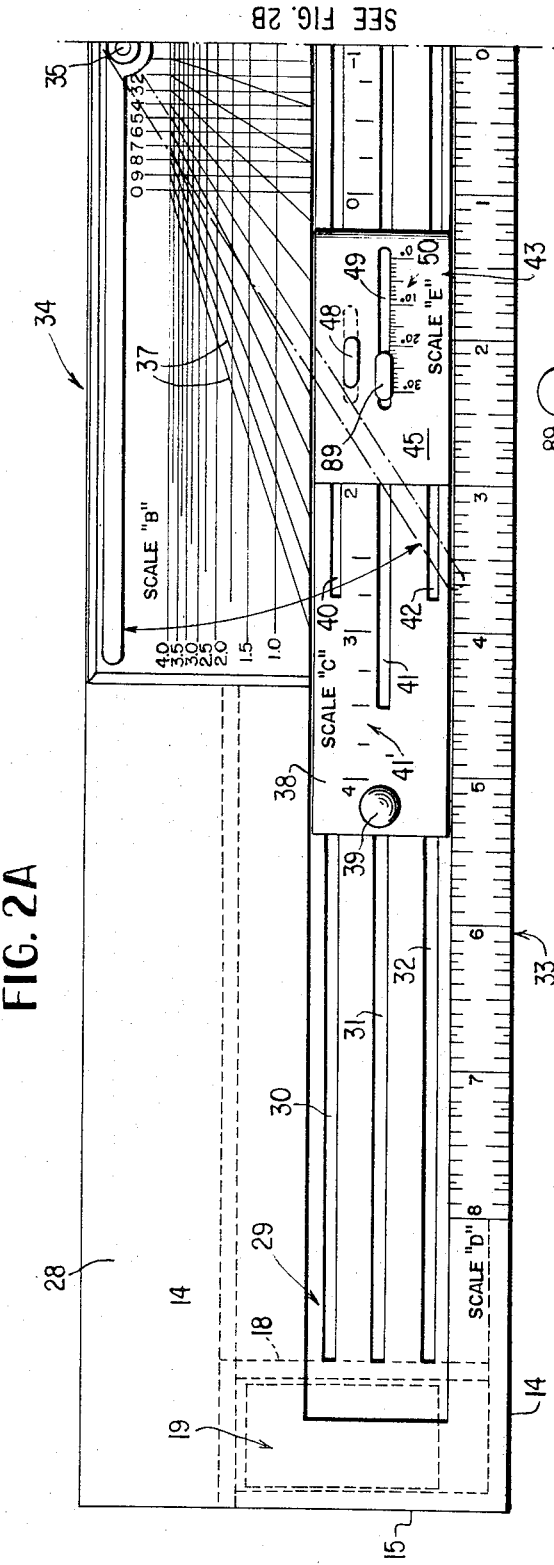
Figure 3A:
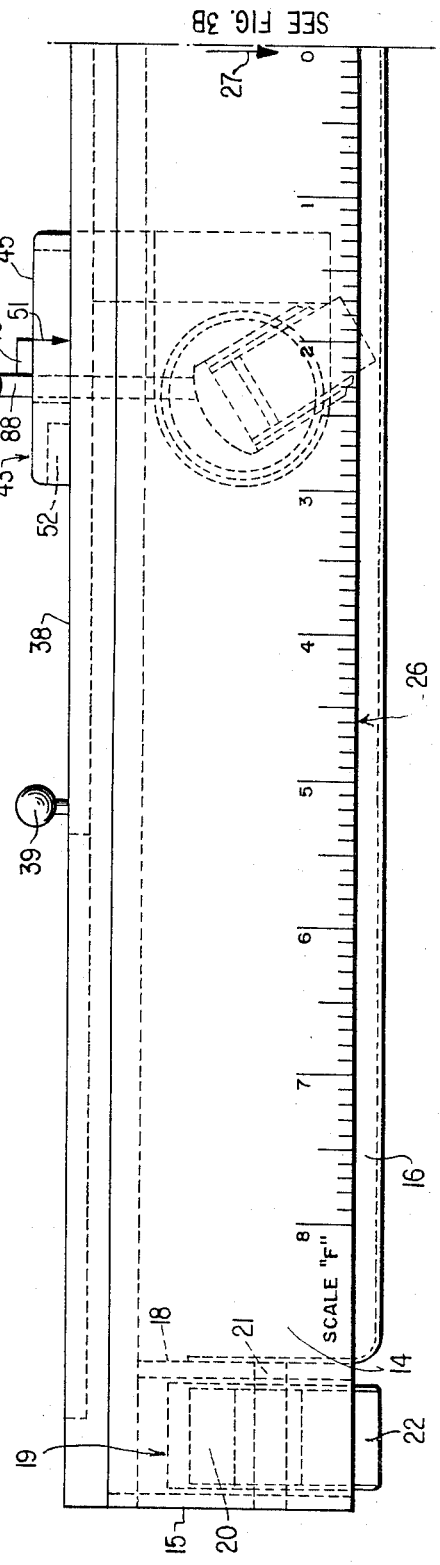

Looking also at FIGS. 2, 3 and 4 it will be seen that body portion 11 is in the form of a relatively long container with side walls 14 and end walls 15. The lower wall of the body portion is formed with a thin rubber or plastic membrane 16, which, as best seen in FIG. 4, is designed to closely adapt to the contour of the top surface 13 of the rail head 17. The body portion as thus formed is trough-like in shape and is constructed to contain a liquid couplant, such as oil or water, not shown, for transmitting ultrasonic energy between ultrasonic generating and receiving means carried in the liquid, in a manner to be described later, and the surface of the rail head.

At each end of body portion 11 walls 18 which extend between side walls 14 define, with end walls 15, chambers, generally indicated at 19, which are open at the bottom. A permanent magnet 20 is mounted on a shaft 21, extending between walls 15 and 20, for relative pivotal movement with respect to the chamber 19. At the lower end of each magnet 20 there is a runner 22, with index mark 23, which extends downward through the open bottom of chamber 19 and clamps the body portion 11 to the top surface 13 of the rail head 17. As shown in FIG. 1 a knurled knob 24 is secured to each end wall 15 so that the body portion 11 can be tilted with respect to the clamping means and another index mark 25 on wall 15 is provided to give an indication of the extent of angular movement.

As shown in FIGS. 1 and 3 a side wall 14 of body portion 11 has a scale generally indicated at 26, with eight inches marked off in both directions from a zero point at which there is an index mark 27. The purpose of this scale will be discussed later.

The top wall portion 12, which is adapted to be secured to and overlie the body portion 11, is a plate, generally rectangular in shape, which has a lip portion 28 that extends transversely away from the body portion 11. A groove, generally shown at 29, extends longitudinally of the top wall portion 12 in the top surface thereof. Three slits 30, 31 and 32 extend downward from the slot through the top wall portion 12 and the purpose of these slits will be explained later.

A scale, generally indicated at 33, similar to scale 26 is located at the side of the groove 29 in the top wall portion 12 and is aligned with the latter scale when the analyzer is assembled. On the opposite side of the groove there is a logarithmic and scalar grid shown generally at 34, with the scalar scale, indicated as scale A and logarithmic scale as scale B. It will be observed that from a central pivot point 35, on which a marker arm 36 is pivotally mounted, scale A consists of a series of spaced parallel lines numbered from 1 to 0 and located on both sides of the pivot point 35. A series of outwardly diverging guide lines 37 extend to both sides from each of the parallel lines. The pivot point 35 is aligned with the "0" (zero) marks on both scales 26 and 33.

The logarithmic scale, scale B, consists of a plurality of spaced but parallel lines, numbered 1.0 to 4.0 which are transversely disposed with relation to the lines of scale A and also cut across the guide lines 37.

Figure 11:
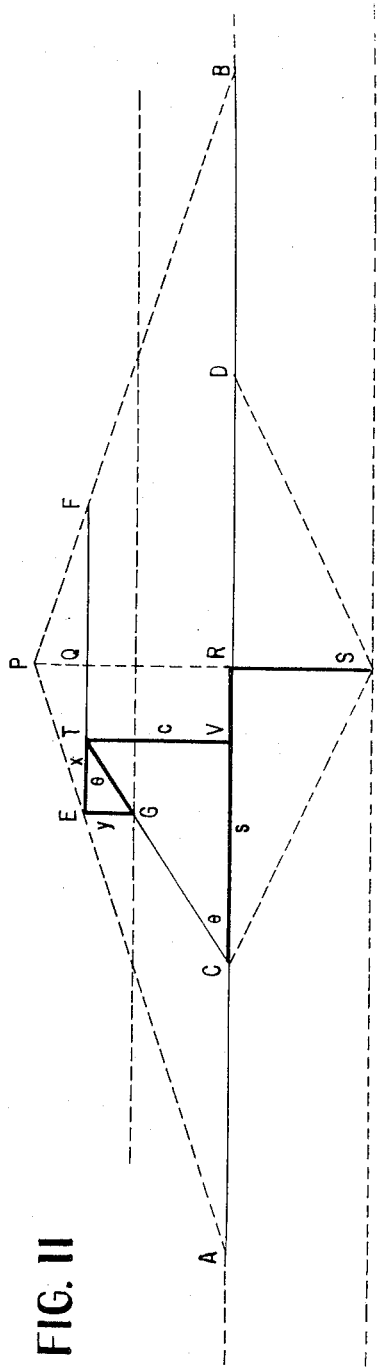
FIG. 11 is a diagram showing the trigonometric functions used in deriving one of the scales used in the analyzer.

The scale B is a logarithmic convergence derived from the space relationships shown in FIG. 11 in which
$AB=$ Maximum possible separation of transmit and receive crystals = 8.0 inches.
$s=$ one-half the selected distance between transmit and receive crystals
$r=$ Ratio of distance from transmit to receive crystals to $AB=CR/AR=s/AR$
$K=$ Convergence factor of $AB$ to $EF=AB/EF=4$.
$QR=c=1.0$ inch $EQ=1.0$ inch
$RS=$ Depth or thickness of specimen, herein regarded as unity (1). As seen in FIG. 11

$$\text{Tan } \theta = c/(s-s/K) = 1/(s-s/K) = y/x$$

and $$x = 1 - (s/K)$$

While $$y = [1-(s/K)]/[s-(s/K)] = (K-s)/(sK-s)$$

The formula $(K-s)/(sK-s)$ is used to derive the logarithmic progression of the horizontal lines on scale B from four inches progressing toward one inch. The distance of the lines corresponding to half the distance between the transmitting and receiving crystals in the analyzer, to be described later, are as follows:

| | |
|---|---|
| 4.0 inches=0.0000" | 2.4 inches=0.2222" |
| 3.8 inches=0.0175" | 2.2 inches=0.2727" |
| 3.6 inches=0.0370" | 2.0 inches=0.3333" |
| 3.4 inches=0.0588" | 1.8 inches=0.4074" |
| 3.2 inches=0.0833" | 1.6 inches=0.5000" |
| 3.0 inches=0.1111" | 1.4 inches=0.6190" |
| 2.8 inches=0.1428" | 1.2 inches=0.7777" |
| 2.6 inches=0.1794" | 1.0 inches=1.0000" |

The areas between the lines of scale B can be color coded to facilitate the reading of the scale.

As seen in FIGS. 1 and 2 the marker arm 36 is shown in a rest position by full lines and in an indicating position by dashed lines. The swing of the arm to one indicating position is shown by the arc segment line with arrows at both ends. The manner in which these scales are used in conjunction with movement of the arm 36 to engage other elements of the analyzer will be discussed later.

A sliding carriage 38, shaped to fit in groove 29, can be manually moved longitudinally of the analyzer 10 by knobs 39 and for ease of movement the carriage 38 can have a lower surface of teflon. As shown best in FIGS. 1 and 2 carriage 38 has three slits 40, 41 and 42, which are aligned with slits 30, 31 and 32, respectively, when the carriage is in the groove. Alongside of slit 41 a scale generally indicated at 41' and marked on the carriage as scale C, has a center point marked "-1," which as best seen in FIG. 2 is laid out with inch marking extending from this point to 4 inch marks near knobs 39.

Two members for adjustably, supporting crystal holders, to be described later, are generally indicated at 43 and 44. These members are of identical construction and are slidable on sliding carriage 38. Each member includes a top plate 45, shaped for guided movement alongside the scalar and logarithmic scale 34, having at one end spaced dependent arms 46 and 47. When members 43 and 44 are in position on sliding carriage 38 the arms 46 and 47 extend downward through slits 40 and 42 in carriage 38 and aligned slits 30 and 32 in top wall portion 12 so that the lower portions of these arms lie in the liquid couplent carried in the body portion 11.

On the top surface of each top plate 45 there is a projecting log stop member 48 which is magnetic and is designed to coact with the marker arm 36 in a manner to be discussed later. In addition there is a slit 49 in each top plate and alongside this slit is a scale, generally indicated at 50, marked from 0 to 30 degrees. Also as shown in FIGS. 1, 3 and 5, each top plate 45 has an index mark 51 on a side face to move over scale 33. A permanent magnet 52 is carried by top plate 45 to adjustably clamp the crystal holder member along sliding carriage 38.

As previously mentioned, the construction of members 43 and 44 is identical and attention is now directed to FIGS. 4–8, inclusive showing more details of member 43. A pair of stainless steel plate members 53, one of which is shown in FIG. 5, are secured, as by rivets 54, to dependent arms 46 and 47 in a manner as best seen in FIG. 5. Each of the plate members 53 has an opening 55 and a circular groove 56, coaxial with this opening as shown in FIG. 8.

As mounted on the arms 46 and 47, the grooves 56 in the pair of plate members 53 face each other and a stainless steel tube 57 is received in the facing grooves to be confined between the plate members. In this manner tube 57 is mounted to lie below, and transversely disposed, with respect to top plate 45. As seen in FIG. 6 this tube has oppositely disposed openings, indicated at 58 and 59, in its wall surface, and the reason for these holes will be explained later.

Rotatably mounted within tube 57 is a stainless steel rod 60, as shown in FIG. 7, and this rod has an axial length approximately equal to the axial length of tube 57. The rod 60 has an opening 61 extending into the rod, as shown by the dashed lines in FIG. 7. A port 62 communicates with opening 61 from the end of the rod and in addition rod 60 has a tapped opening 63 for a purpose described below.

A crystal holder generally indicated at 64, for a crystal 65, is adapted to be carried within the opening 61 to project from the rod 60, as best seen in FIG. 5. The crystal holder 64 includes an outer cylinder 66 of a material such as Lexan, manufactured by General Electric Co. This outer cylinder 66 receives phenolic rod 67, which is a plastic consisting of pressed cellulose fiber that is considered a "dead" material as far as ultrasonic energy is concerned.

The manner in which crystal 65 is positioned within the crystal holder 64 is as follows. The phenolic rod 67 is milled from both ends to provide a central seat portion 68 with a circumferential ledge 68'. The crystal 65 which, in one actual embodiment is a 2.25 megacycle crystal produced by the Clevite Corp., is then bonded by epoxy resin to a nylon focusing rod 69 at a flat end surface 69'. The rod 69 is then inserted into the lower milled end of phenolic rod 67 until crystal 65 is seated on ledge 68' and suitably secured therein as by epoxy. In this position internal lead wires 70 and 71, which are soldered to either side of crystal 65, can then be extended into the upper milled end of rod 67 through small holes in the seat 68. Suitable external leads 70' and 71' are then connected to the internal lead wires, in the upper milled end and this end is then filled with epoxy as indicated at 72. These external leads are taken out through port 62 and thence through opening 55 in the plate member 53.

The end face 69" of focusing rod 69 is then dressed so that it protrudes slightly from the holder 64 and will almost touch membrane 16 when the holder 64 is operatively positioned in the vertical position in the body portion 11.

Figure 9:
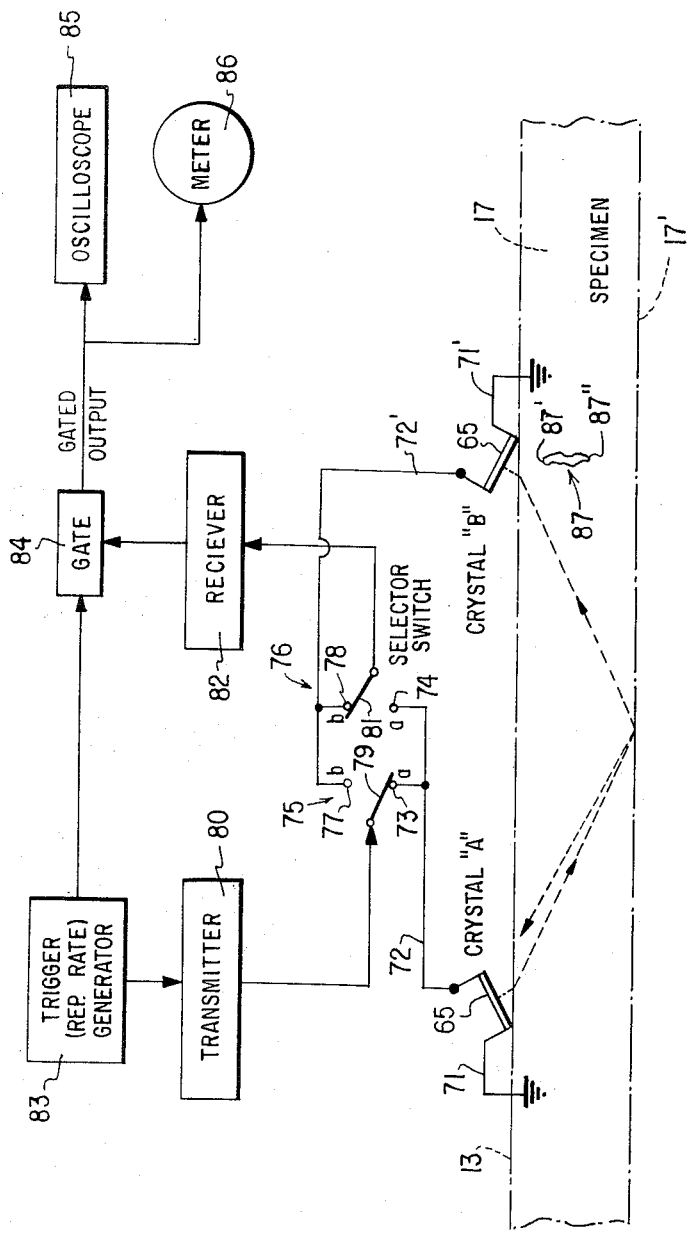
FIG. 9 is a diagrammatic disclosure of the electronic system associated with the transducers used in the analyzer.

Looking at FIG. 9 two crystals, 65, are shown, diagrammatically, as suitably coupled to the surface of a rail head 17. For ready reference the crystal at the left is considered to be that associated with member 43 while the crystal at the right is associated with the member 44 and its leads have prime indications. Leads 71 and 71' are to ground while lead 72 is connected to contacts 73 and 74 of switches, generally indicated at 75 and 76 respectively. Lead 72' is connected to contacts 77 and 78 of the switches. As such switches are well known they are not illustrated in detail, but they can be mounted either on the analyzer 10 or outside this analyzer. For example, in FIG. 1, the switches 75 and 76 are shown mounted on top wall portion 12 to be associated with the crystals carried by the members 43 and 44 respectively.

In switch 75 the movable contact member 79 is connected to a transmitter shown in block form at 80, while movable contact member 81 of switch 76 is connected to a receiver shown in block form at 82. Transmitter 80 is connected to a trigger (rep.rate) generator, shown by block 83 which in turn is connected to the gate shown by block 84. Gate 84 is connected to oscilloscope 85 and millivolt meter 86, both shown in block form.

Because the circuits for transmitter 80, receiver 82 trigger (rep.rate) generator 83 and gate 84, are not, of themselves, a part of the invention and because such circuits are well known in the art, it is not believed necessary to describe such circuits in detail.

For the moment it can be appreciated that when switches 75 and 76 are in the positions shown in FIG. 9, crystal 65 at the left can transmit ultrasonic energy in a continuous mode to a lower surface of the rail head where it reflected to the crystal 65 at the right and the signal is detected to be processed through the receiver 82 to the indicating means such as the oscilloscope 85 or the meter 86. Conversely, as the crystals can be used interchangeably, contact 79 can be moved to engagement with contact 75 and contact 81 be moved to engage contact 74, and then the transmitting and receiving crystals are reversed.

On the other hand if the switch 76 is moved so that movable contact member 81 engages switch contact 74 instead of contact 78 then the crystal 65 on left continues to transmit but it is also connected to the receiver 82 and the crystal 65 on the right is cut out of the circuit. In this arrangement crystal 65 at the left transmits energy and receives energy reflected at surface 17' in the known pulse-echo mode.

The mode of operation will be discussed in more detail later in conjunction with the use of the analyzer 10 to scan a transverse fissure defect, generally shown at 87 in the rail head 17. Note that this defect extends vertically but, as is common with a defect of this type, it also extends an appreciable distance transversely of the rail head as seen in FIG. 10.

As illustrated in FIG. 9 the two crystals 65 are disposed at an angle with respect to the top surface of the rail head 17 and means are provided in the analyzer 10 whereby this angle can be varied to achieve optimum and desired results. Attention is directed to FIGS. 1 and 5 where a lever member 88 with a knob portion 89 is shown associated with each of the crystal holder members 43 and 44. This lever member with each of the members is disposed with the knob portion 89 over the top plate 45 and with the lever extending down through aligned slits 49, 41 and 31 to be threadably engaged, at its lower end, in tapped opening 63 of rod 61. As best seen in FIG. 5, lever member 88 extends through opening 58 in tube 57 and it will be appreciated that by grasping knob portion 89 the lever member 88 can be swung to any desired position along scale 50 and this movement also swings the holder 64 with crystal 65, in a vertical plane. As illustrated in FIGS. 3 and 5 the crystal 65 is disposed at an angle of 30°, with respect to the vertical, and this is indicated on scale 50.

The operation of analyzer 10 in conjunction with the electronic systems will now be described. Assuming that a suspected defect in a railroad rail head or other parts of a rail has been located by other means, such as a mobile flaw detector car passing along the track. The analyzer 10 is then positioned on the top surface 13 of the rail head 17 with the index mark 27 slightly to the left of the suspected defect. Index members 23 on runners 22 are aligned with respect to the surface of the rail head to define a longitudinal axis of scan selected according to the probable location of the defect. For example, in the case of a typical detail fracture this axis would be chosen to be about half an inch from the gauge side of the rail in track.

The sliding carriage 38 is centered in groove 29 as indicated along scale 33. Crystal holder member 43 is located with the left edge of top plate 45, as viewed in FIG. 3, opposite the zero mark on scale 41'. The crystals 65 in both members 43 and 44 are moved, by means of lever members 88, to an inclination angle of about 27° with respect to the rail surface and as indicated along scale 50.

Movable contact member 79 of switch 75 is moved to contact 73 while movable contact member 81 of switch 76 is moved to contact 74 to enable the crystal 65 in member 43 to transmit and receive in a pulse-echo mode of operation.

After the preliminary work described above is completed the analyzer 10 is moved from left to right until the defect is intercepted or encountered by the pulsed-ultrasonic energy wave train being transmitted by the crystal 65 and the ultrasonic energy is reflected to be received by this same crystal. This echoed signal appears on the screen of the oscilloscope 85 or, as an alternative, a simultaneous read-out, in the form of a sharp rise in voltage on the millivolt meter 86.

Movement of the analyzer 10 is continued toward the right until the signal diminishes on the millivolt meter or the signal on the cathode ray tube of the oscilloscope migrates toward zero time or to a preselected grid line. This indicates transit of the defect and will locate the defect within two or three inches of the zero point on scales 26 and 33.

Next the members 43 and 44 are spaced apart on sliding carriage 38 a selected distance such as 4 inches. Now instead of a movement of the analyzer 10 from left to right, as above described, the sliding carriage 38 only is moved left to right until the signal is indicated and diminishes, as also described above. The position of the index mark 51, on the member 43 with respect to scale 33 is noted when the signal migrates to zero time or to the predetermined grid line on the scope.

Switches 75 and 76 are then reversed so that crystal 65 on member 44 becomes the operative crystal in the pulse-echo mode of operation. Carriage 38 is then slid from right to left until the signal reflected from the defect migrates to zero time or to a predetermined grid line, as above described. This position in scale 33 as indicated by index mark 51, is noted and the central point on scale 33 between this position and the position previously noted gives the approximate location of the defect to be analyzed. The rail head 17 is marked at the corresponding point on scale 26 and the entire analyzer 10 is moved until the zero on scale 26 corresponds to the mark on the rail head. The analyzer 10 is then centered over the suspected defect which is to be analyzed in the manner set forth below.

The analyzer 10 is now moved laterally on the surface of the rail head 17 until the longitudinal axis of the crystals 65, which axis is indicated by index marks 25 on end walls 15, is aligned at that position on the surface marked at 1 as seen in FIG. 10. By means of knobs 24 the body portion 11 can be inclined or canted on the runners 22 magnetically clamped to the rail until a strong signal is reflected from the lower surface of 90 of the rail head 17, as indicated by the dashed line extending from 1 to the arrow.

More or less simultaneously with the canting of the body portion 11 the angular disposition of the crystals 65 in the liquid in the boyd portion, and with respect to the top surface 13 of the rail head 17, can be adjusted by lever members 88 to achieve the best signal.

At this point movable contact member 79 of switch 75 is moved to contact 73 while switch 76 is retained with movable contact member 81 and contact 78 connected. This then enables the crystal 65 on member 43 for transmission only while the other crystal 65 on member 44 is for receiving only.

The members 43 and 44 are then set on sliding carriage 38 at equal distances away from the center (−1) mark on scale 41' and are clamped to the carriage 38 by the permanent magnets 52 so they can move with the carriage. The carriage 38 is then moved to the far left position, as seen in FIG. 1, in groove 29 and a pass of the carriage to the right and along position line 1 is commenced. It will be understood that, until the transmission of ultrasonic energy between the transmitting and receiving crystals 65 is attenuated at the defect 87, the signal is reflected from the lower surface 90 in the manner shown in FIG. 9.

Now assuming that the left and right hand crystals 65, shown in FIG. 9, are being moved to the right it will be apparent that the reflected train of ultrasonic energy will ultimately impinge on a top surface 87' of defect 87 and transmission to the receiving crystal will be blocked for a certain period of time during movement of the crystals to the right. Transmission will only be resumed as the train emerges from the defect at the lower surface 87". This eclipse of ultrasonic energy is indicated by the oscilloscope 85 and millivolt meter 86 so that the location of the sliding carriage 38 can be determined at the time the top surface 87' is encountered by the wave train and at the time the wave train emerges at the lower surface 87".

At the time the eclipse of ultrasonic energy commences a reading is taken with respect to the logarithmic and scalar grid 34. This involves swinging marker arm 36, on pivot point 35, at the right until it encounters the magnetic lug stop member 48 on the holder member 44 to which it will clamp. If, for example, the movable crystal holder members 43 and 44 had been initially set at 2, as shown in FIG. 2, this scale line on scale B is read to its intersection with marker arm 36 and gives the depth of the upper limb or surface 87' in percentiles of the thickness of the material being tested, as read on the vertical lne of scale A. In FIG. 2 it will be observed that at the dashed line position of the marker arm 36 and at the 2.0 scale line of scale B, the 0 scale line of scale A is read and this would indicate a 100 percent depth or no defect and a reflection from the lower surface 90.

The emergence of the train of ultrasonic energy from the lower limb or surface 87" can be read in the same manner as described in the preceding paragraph.

After a pass has been made from left to right along the position line 1, as described above, and the appropriate readings taken, the sliding carriage 38 can be moved to the far right position in groove 29 and a pass made from right to left to take readings on the upper and lower limbs of the defect 87. In taking the readings in this direction it will be understood that the marker arm 36 is moved to contact the magnetic lug stop member 48 on the left hand member 43.

At this time two fixes have been obtained for depth of the upper and lower limbs of the defect 87 and it is possible to average these to give a valid figure. However, if desired, additional fixes can be taken along the same position line 1 for corroboration. This can be done by spacing the members 43 and 44 in the sliding carriage 38 at a different distance and then repeating the passes and taking new reading on the logarithmic and scalar grid.

In order to determine the transverse extent of the defect 87 it is necessary to take passes along different position lines and a number of such positions are illustrated in FIG. 10. For example, after completion of the passes along position line 1 the analyzer 10 can be transversely displaced so that the crystals are aligned at position 2 and the same procedure of test can be repeated. This transverse displacement of the analyzer can be repeated to any desired number of positions to determine the profile of the flaw.

While the discussion of the method of testing, according to the invention, has so far been concerned with testing in the rail head 17 the method is not limited to this area. As seen in FIG. 10, the ultrasonic energy, being transmitted from transmitting crystal 65 to the receiving crystal 65, can be reflected from the lower surface 90 of the rail head 17 as shown, for example, by dashed lines extending from 1 to 5 and from 9 to 13. However, by canting the analyzer 10 to a greater degree the fillet area 91 can be scanned as indicated by the dashed line extending from position 7.

The invention is also useful in testing in the web 92 of a rail. In this case the ultrasonic energy is reflected from the lower surface 93 of the base 94 of the rail. This is also shown in FIG. 10 by dashed lines extending from 6 to 8 into the web 92 and would be effective to locate a defect 95 which might be, for example, a bolt hole break.

After a number of fixes have been obtained it is desirable to record the results on a plot sheet so that the extent of the flaw can be easily seen and studied. This is important also as providing a record on which succeeding tests can be plotted to give a history of the material being tested. In the case of welds this is particularly helpful because some welds, such as welds in rail which are done in the field, present a complex internal picture for analysis according to the invention. Thus the keeping of comparative and continuing records of weld analysis is essential to any meaningful analysis of defective welds. In this respect a "norm" pattern can be established by the comparison and study of many tests of normal welds and important deviations established by visual insepction through laboratory breakage.

While, as above described, it is desirable that fixes on the flaw be taken from both sides of this flaw it is not absolutely essential because it has been found that where this can not be done, as for example, a seam or some other impediment prevents a pass from one side, then fairly accurate fixes can be achieved from the other side only.

It will be understood that the above description of the present invention is susceptible to various modifictions, changes and adaptations, and the same are intended to be comprehended within the meaning and range of equivalents of the appended claims.

I claim:

1. A method for analyzing the extent of a defect, lying between spaced apart first and second boundary surfaces of a material, by means of a pair of spaced apart ultrasonic transducers, which are connected to electrical signal generating and indicating means, and which are movable as a unit over the first boundary surface in ultrasonic energy transmission relationship with the material at the first boundary surface thereof, comprising the steps of:

a. moving the transducers spaced apart at a predetermined distance and as a unit, along a first straight line lying over the first boundary surface, toward the defect while simultaneously transmitting ultrasonic energy from one transducer, along a path of travel in which the energy is reflected from the second boundary surface, to the other transducer connected to the indicating means;

b. moving a marker member to a position to indicate the location of one of the transducers along the position line with respect to the location of the defect when the indicating means shows that transmission of ultrasonic energy along that portion of the path of travel from the second boundary surface to the other transducer is beginning to be attenuated at the defect;

c. reading a logarithmic and scalar grid associated with said marker member to determine the relative distance of the top of the defect from the first boundary surface as compared to the distance from that surface to the second boundary surface;

d. continuing the movement of the transducers as a unit along the first position line;

e. moving the marker member as in step (b) when the indicating means shows that transmission of ultrasonic energy along the path of travel has commenced again; and f. reading the grid in the same manner as in step (c) but in order to determine the relative position of the bottom of the defect.

2. The method as defined in claim 1 comprising the additional steps of:

g. reversing the connections from the electrical signal generating and indicating means to the transducers so that the flow of ultrasonic energy along the path of travel is from the other transducer to the one transducer;

h. moving the transducers as a unit along the first straight line toward the defect but in the opposite direction to that of step (a); and i. repeating steps (b) through (f).

3. The method as defined in claim 2, wherein steps (a) through (i) are repeated along a second straight line transversely displaced from the first straight line but generally parallel thereto.

4. The method as defined in claim 2, wherein steps (a) through (i) are successively repeated along a plurality of straight lines each of which is transversely displaced from the first straight line but which are generally parallel thereto.

5. The method as defined in claim 1 wherein steps (a) through (f) are repeated but with the transducers spaced apart at another predetermined distance.

6. The method as defined in claim 2, wherein steps (a) through (i) are repeated but with the transducers spaced apart at another predetrmined distance.

7. The method as defined in claim 4 comprising the additional steps of plotting the distance determinations obtained in steps (c) and (f).

* * * * *